United States Patent [19]
Falkowski

[11] Patent Number: 5,492,218
[45] Date of Patent: Feb. 20, 1996

[54] ADJUSTABLE RAILING SUPPORT POST FOR CONVEYOR LINES AND METHOD OF USE THEREOF

[75] Inventor: Witold W. Falkowski, Kitchener, Canada

[73] Assignee: Joseph E. Seagram & Sons, Ltd., Waterloo, Canada

[21] Appl. No.: 333,316

[22] Filed: Nov. 1, 1994

[51] Int. Cl.[6] .................................................. B65G 21/20
[52] U.S. Cl. ......................................................... 198/836.3
[58] Field of Search ............................ 198/836.1, 836.3, 198/836.4

[56] References Cited

U.S. PATENT DOCUMENTS

| | | | |
|---|---|---|---|
| 3,647 | 3/1972 | Didas | 198/836.3 |
| 3,280,962 | 10/1966 | Stone et al. | 198/836.3 |
| 3,776,350 | 12/1973 | Tice | 198/836.3 |
| 3,800,938 | 4/1974 | Stone | 198/836.3 X |
| 4,470,499 | 9/1984 | Sijbrandji | 198/836.3 |
| 4,502,594 | 3/1985 | Sijbrandij | 198/836.3 |
| 5,322,160 | 6/1994 | Markiewicz et al. | 198/836.3 |

*Primary Examiner*—D. Glenn Dayoan
*Attorney, Agent, or Firm*—Daryl W. Schnurr

[57] ABSTRACT

A railing support post has various positions that are readily repeatable by using retainers of different sizes that can be inserted onto the post. When it is desired to run bottles of a different type along the conveyor line, the posts can be readily adjusted by replacing all of the spacers with new spacers. Once a particular bottle has been run the first time, the adjustment is repeatable simply by reinserting the same spacers that were used for the first run. Previous railing support posts are adjustable but the adjustment is not readily repeatable and is not as fast or as simple as the adjustment of the present invention.

9 Claims, 6 Drawing Sheets

ADJUSTABLE RAILING SUPPORT POST FOR CONVEYOR LINES AND METHOD OF USE THEREOF

BACKGROUND OF THE INVENTION

1. Field of the Invention

This invention relates to an improved railing support post for use with a conveyor line and a railing for said conveyor line and a method of operation thereof. More particularly, this invention relates to a railing support post and a method of operation thereof where the post can be quickly and accurately adjusted between predetermined fixed positions.

2. Description of the Prior Art

Railing support posts are known and have been used with conveyor lines in the bottling industry where bottles and other containers are filled with liquid using automatic filling machines. After filling, the bottles are capped and packed. The bottles, which are usually made of glass or plastic, are fed along one or more conveyor lines in these systems. Each conveyor line has a railing supported by a series of railing support posts and extending along each side of the conveyor line to prevent the bottles from tipping sideways as the bottles are moved along the conveyor line. When a bottle of a particular type or size or shape is being run on the system, the railings must be set a certain distance apart. For some types of bottles, the railings are actually set close enough to the bottles so that as the bottles move along the conveyor line, the sides of the bottles are in contact with the railings. For other types of bottles, the railings are spaced so that there is clearance between the railings and the sides of the bottles as the bottles move relative to the railings. Previous railing support posts are adjustable to move the railings on either side of the conveyor line either further apart or closer together and to hold the railings in a fixed position once the appropriate distance has been determined.

The distance that the railings are apart from one another must be changed each time a new run is commenced with a different size or shape of container or bottle. Previous railing support posts are adjustable to allow the railings to be moved either closer together or further apart and to be held in a fixed position. However, the adjustments are not readily repeatable and when the conveyor line must be changed to accommodate a new run, a considerable amount of time must be taken to adjust the railings properly. Depending on the length and complexity of the conveyor line, changeovers can take a number of hours. Sometimes when a new run is commenced, it is necessary to operate the conveyor line for some time to determine whether it is operating satisfactorily and it is sometimes necessary to make further adjustments resulting from the initial operation.

Many industries today have made a changeover to just-in-time deliveries so that manufacturers no longer store a large amount of inventory in warehouses. Instead, manufacturers strive to have zero inventory and can keep only a minimum volume of inventory by having the ability to produce the product quickly after it is ordered. When conveyor lines are used, the just-in-time delivery system results in many more runs being required with each of the runs having a relatively short duration. It is therefore very important to be able to change the conveyor system very quickly in order to accommodate the bottles or other containers of a new run.

SUMMARY OF THE INVENTION

It is an object of the present invention to provide a railing support post that can be changed between predetermined fixed positions quickly and efficiently and returned to any position as desired.

A railing support post is used with a conveyor line and a railing for said conveyor line, said conveyor line transporting bottles. The support post has an elongated central member with two ends. A handle is located at one end and a clamp at the other end. The member is partially located in an elongated sleeve and is movable within said sleeve. The sleeve contains a spring that is seated between said sleeve and said member to urge said sleeve towards said clamp. The clamp is able to receive said railing. A bracket is attached to said sleeve for mounting said posts substantially normal to said line. The member moves relative to said sleeve when an inward force is applied to said handle and moves outward relative to said sleeve when said force is released. There is a retainer on said post so that said central member has a fixed position relative to said sleeve when said retainer is in position. The retainer is removable.

A method of adjusting a railing support post for use with a conveyor line or the like and the railing for said conveyor line, said support post having an elongated central member with two ends, said central member being longitudinally adjustable by using a retainer on said post, said method comprising commencing with said post mounted on a conveyor line, moving said central member inward and activating said retainer to hold said central member in a first fixed position, subsequently deactivating said retainer and moving said central member, activating said retainer to hold said member in a second fixed position, repeating said steps for other positions.

DESCRIPTION OF A PREFERRED EMBODIMENT

Figure 1:
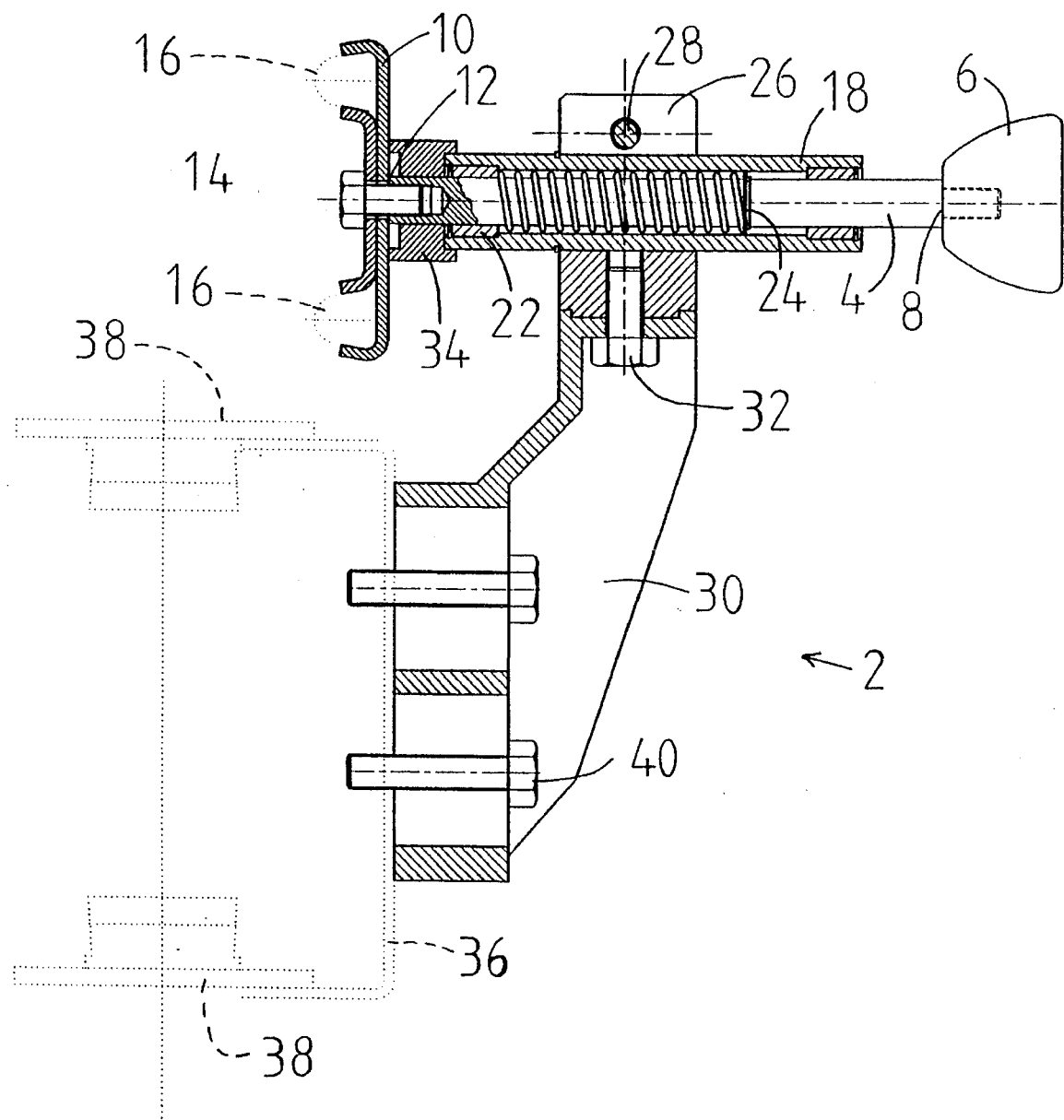
FIG. 1 is a sectional side view of a railing support post with a first spacer inserted on said post.

In FIG. 1, a railing support post 2 has an elongated central member 4 with a handle 6 affixed to the central member 4 at one end 8 and a clamp 10 bolted to the central member 4 at the other end 12 by means of a bolt 14. The clamp 10 is conventional and supports two rails 16 of a conventional railing (shown as a dotted line). The central member 4 is partially located in an elongated sleeve 18 and is movable within said sleeve. The sleeve contains a spring 20 that is seated between a base 22 and a ring 24 to urge said sleeve towards said clamp. The spring 20 surrounds said central member 4. A bracket 26 surrounds said sleeve and can be adjusted to different positions along the sleeve 18 by opening and then tightening an ALLEN (a trade mark) screw 28. The bracket 26 is bolted to a support 30 by means of a bolt 32. A first spacer 34 is located on the central member 4 between the sleeve 18 and the clamp 10 to hold the central member in a fixed position relative to said sleeve 18. The retainer 34 is removable. When the posts 2 are first installed on a particular conveyor line, it may be necessary to loosen the ALLEN screw and adjust the sleeve 18 longitudinally within the bracket 26 to bring the post within the appropriate range so that subsequent adjustments can be made simply by inserting a spacer of appropriate size.

The support 30 is bolted to a frame 36 of a conveyor line 38 by bolts 40. The frame 36 and conveyor line 38 are shown as dotted lines as they are conventional and are not part of the railing support post 2.

Figure 2:
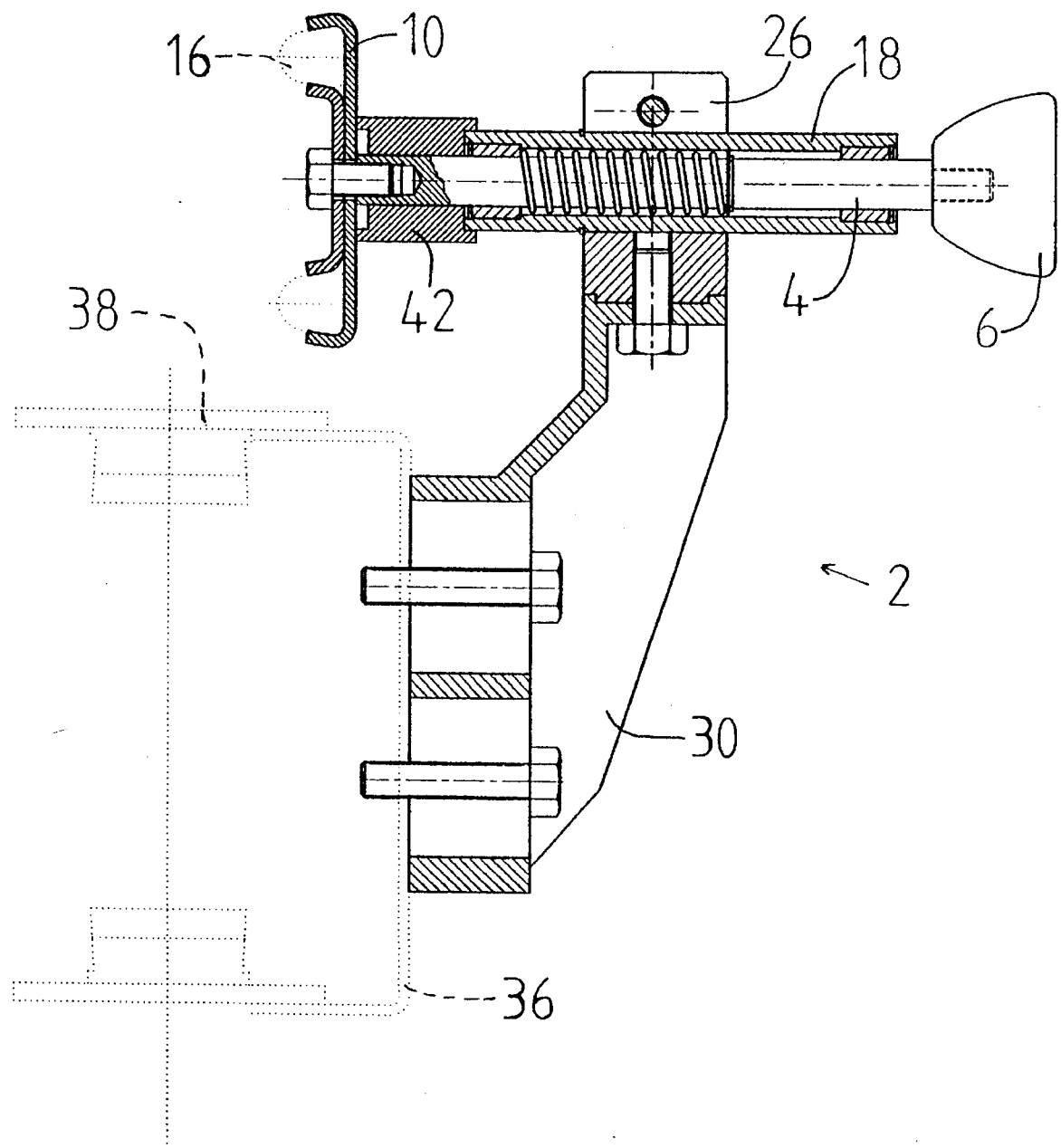
FIG. 2 is a sectional side view of a railing support post with a second spacer inserted on said post.

In FIG. 2, it can be seen that the railing support post 2 has a second spacer 42 which is larger than the post 2 shown in FIG. 1. The larger spacer results in the central member 4 moving further inward relative to the sleeve 18 and the clamp 10 and the railing 16 being closer to the conveyor 38.

Figure 3:
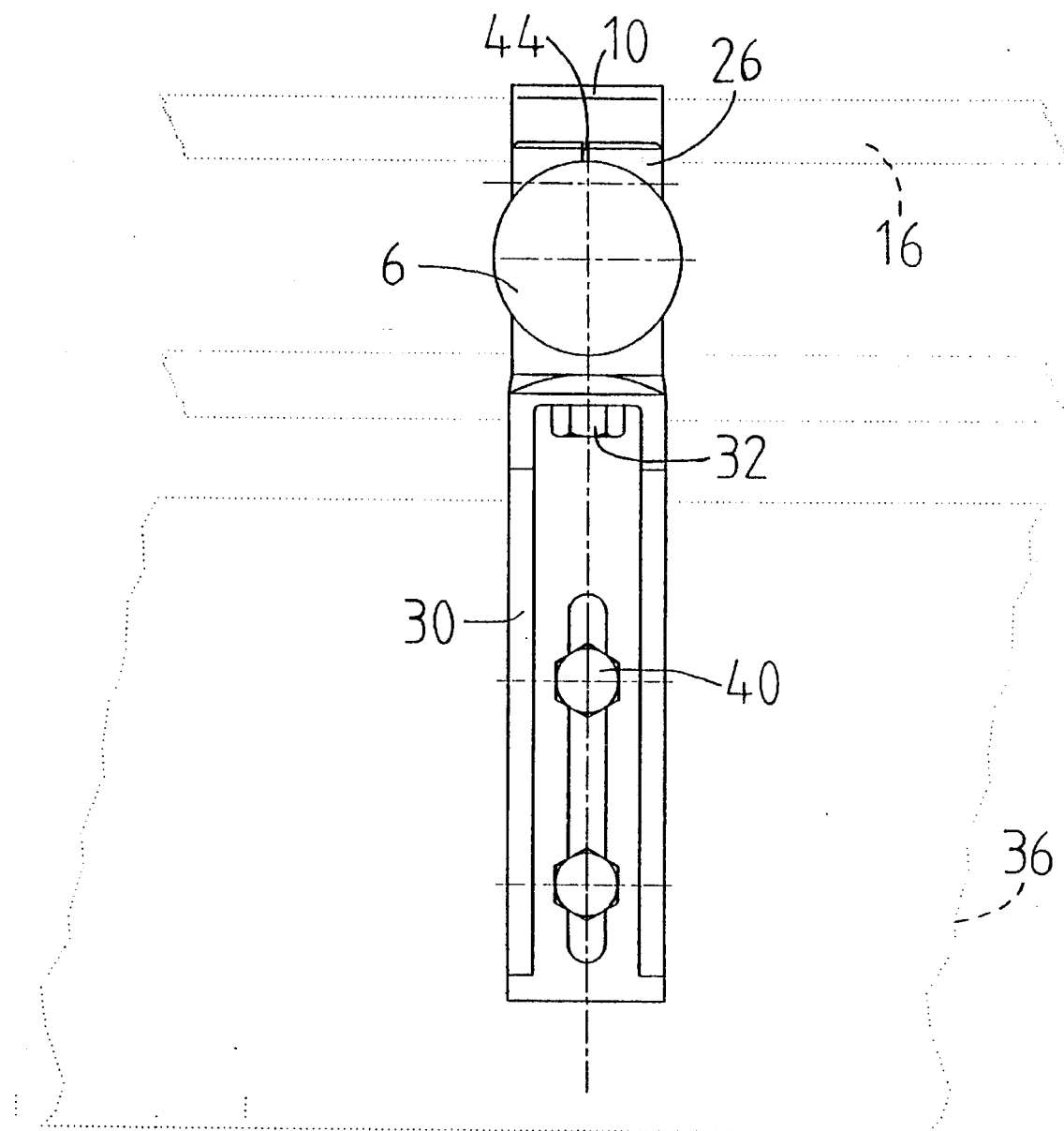
FIG. 3 is a front view of said railing support post.
Figure 4:
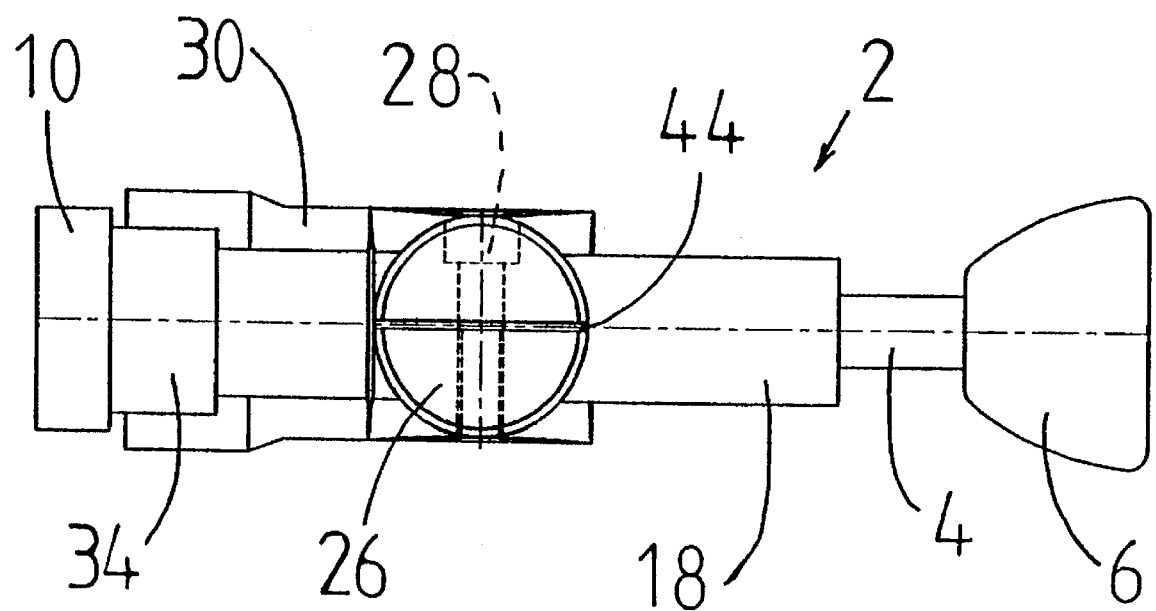
FIG. 4 is a top view of said railing support post.

In FIG. 3, it can be seen that the bracket 26 has a split 44 at a top thereof so that, as the ALLEN screw 28 is tightened, the bracket 26 tightens onto the sleeve 18. The same slit 44 can be seen in FIG. 4.

Figure 5:
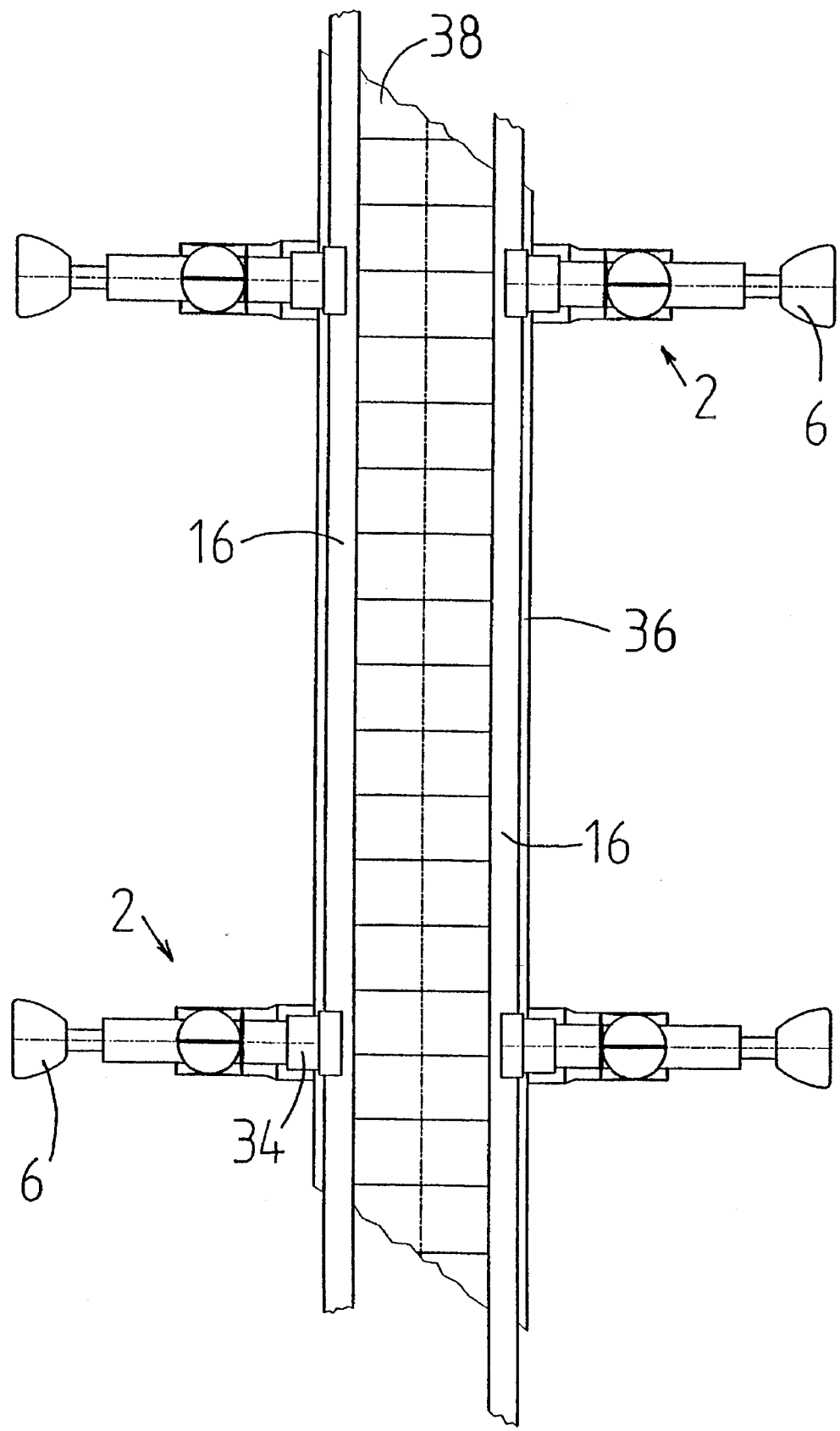
FIG. 5 is a partial schematic top view of conveyor line with railings extending along each side, said railings being supported by railing support posts.

In FIG. 5, the conveyor line 38 has railings 16 extending along each side. The railings are supported by railing support posts 2 having spacers 34 inserted on the posts. In order to adjust the railings 16 either inward or outward when running a different bottle on the conveyor line, the spacers 34 must be removed from each of the support posts and replaced with spacers of a different size. In all cases, it is preferable that all of the replacement spacers have an identical size, though different from the size of the spacers 34. If it is desired to move the railings 16 closer to the conveyor line 38, the handle 6 on each of the support posts 2 would be forced inward by an operator, the spacer 34 would be removed and replaced with a larger spacer. After the larger spacer is placed onto the post 2, the inward force on the handle 6 is removed. This method would be repeated for each of the support posts 2 along the entire conveyor line. Preferably, the spacers would be colour-coded and all spacers having the same size would also have the same colour. If it was desired to move the rails 16 further from the conveyor line 38, the method would be repeated except that the spacers in each of the support posts 2 would be removed and replaced with a spacer having a smaller size. The first time that a particular bottle or other container is being run on the conveyor line, it will be necessary to make appropriate measurements and have spacers formed of the appropriate size. Some experimentation may be required at this stage. However, whenever that same bottle is run in the future, it becomes a relatively simple matter to insert those particular spacers that were used for that particular bottle when it was run previously. When a bottle of another type is used that has been run previously, it is simply a matter of replacing the existing spacers with the particular spacers for that particular bottle. Thus, it can be seen that the changeover to move the rails from a first position for one size or shape of bottle to a second position for another size or shape of bottle is relatively simple and can be accomplished accurately and quickly. The position of the support posts 2 is easily repeatable. Further, the operator changing the spacers does not have to be particularly skilled in order to make the change, thereby resulting in further savings.

Figure 6:
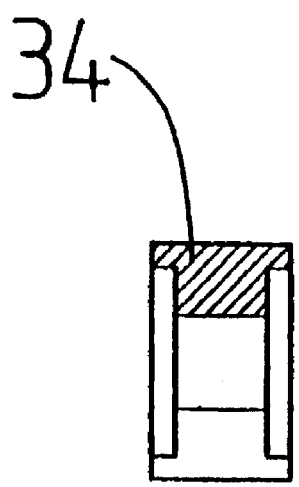
FIG. 6 is a sectional side view of a spacer.
Figure 7:
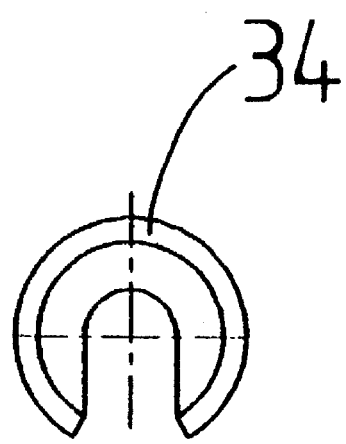
FIG. 7 is a front view of a spacer.

In FIGS. 6 and 7, there is shown a spacer 34. It can be seen that the spacer 34 has a slot 46 along one side so that the spacer can be inserted onto the central member 4.

While the support posts of the present invention can be used with bottles and other suitable containers, as well as both glass and plastic bottles, the posts and the method of adjusting the posts is particularly suited to be used with bottles. Variations within the scope of the attached claims will be readily apparent to those skilled in the art. For example, the member can be held in a fixed position by activating a retainer. Subsequently, the retainer is moved to another position and the retainer is reactivated.

What I claim as my Invention is:

1. A railing support post for use with a conveyor line and a railing for said conveyor line said conveyor line transporting bottles, said support post comprising an elongated central member having two ends with a handle at one end and a clamp at the other end, said member being partially located in an elongated sleeve and being movable within said sleeve, said sleeve containing a spring that is seated between said sleeve and said member to urge said sleeve towards said clamp, said clamp being able to receive said railing, a bracket attached to said sleeve for mounting said post substantially normal to said line, said member moving relative to said sleeve when an inward force is applied to said handle and moving outward relative to said sleeve when said force is released, with a retainer on said post so that said control member has a fixed position relative to said sleeve when said retainer is in position, said retainer being removable.

2. A post as claimed in claim 1 wherein the retainer is a plurality of spacers of different sizes that can be used sequentially with said post, said spacers having a generally cylindrical shape with a slot along one side so that the spacer can be placed on said post when said post has been forced inward by an inward force on said handle, said spacer being located between said clamp and said sleeve.

3. A support post as claimed in claim 2 wherein the bracket is adjustable on said sleeve so that said sleeve can be moved longitudinally relative to said bracket and fixed in a particular position.

4. A post as claimed in claim 3 wherein said spring surrounds said post and is seated between a base of said sleeve and a ring on said member.

5. A method of adjusting a railing support post for use with a conveyor and a railing for said conveyor, said support post having an elongated central member with two ends, a handle at one end and a clamp at the other end, said member being partially located in an elongated sleeve, said sleeve containing a spring that is seated between said sleeve and said member to urge said sleeve towards said clamp, a bracket attached to said sleeve for mounting said posts substantially normal to said line, said sleeve being adjustable longitudinally within said bracket, said method comprising commencing with the post mounted on a conveyor line, applying inward force to said handle to move said member inward longitudinally, placing a first spacer on said post between said clamp and said sleeve and releasing said force so that said member moves outward relative to said sleeve until stopped by said first spacer, subsequently applying inward force to said handle to move said post inward longitudinally, removing said first spacer and substituting a second spacer on said post and releasing said force, said first and second spacers having different sizes.

6. A method as claimed in claim 5 wherein there are a plurality of posts and a plurality of spacers for each post, said method including the steps of replacing all of the spacers of the same size on all of the posts with spacers of a different size.

7. A method as claimed in claim 6 wherein the spacers are colour-coded with spacers of identical size having the same colour.

8. A method of adjusting a railing support post for use with a conveyor line and a railing for said conveyor line, said support post having an elongated central member with two ends, said central member being longitudinally adjustable by using a retainer on said post, said method comprising commencing with said post mounted on a conveyor line, moving said central member inward and activating said retainer to hold said central member in a first fixed position, subsequently deactivating said retainer and moving said central member, activating said retainer to hold said member in a second fixed position, repeating said steps for other positions.

9. A method as claimed in claim 8 wherein said retainer is a plurality of spacers of different sizes.

* * * * *